(12) United States Patent
Nakamura

(10) Patent No.: US 8,652,562 B2
(45) Date of Patent: Feb. 18, 2014

(54) POWDERY SEASONING AND METHOD FOR PRODUCING THE SAME

(75) Inventor: Satoru Nakamura, Chiba (JP)

(73) Assignee: Kikkoman Corporation, Chiba (JP)

( * ) Notice: Subject to any disclaimer, the term of this patent is extended or adjusted under 35 U.S.C. 154(b) by 0 days.

(21) Appl. No.: 13/392,349

(22) PCT Filed: Sep. 8, 2010

(86) PCT No.: PCT/JP2010/065393
§ 371 (c)(1),
(2), (4) Date: Feb. 24, 2012

(87) PCT Pub. No.: WO2011/030779
PCT Pub. Date: Mar. 17, 2011

(65) Prior Publication Data
US 2012/0156356 A1    Jun. 21, 2012

(30) Foreign Application Priority Data

Sep. 10, 2009   (JP) ................................. 2009-209386

(51) Int. Cl.
*A23L 1/221*    (2006.01)
*C12J 1/00*    (2006.01)

(52) U.S. Cl.
USPC ............................................ 426/650; 426/18

(58) Field of Classification Search
None
See application file for complete search history.

(56) References Cited

U.S. PATENT DOCUMENTS 3,932,671 A * 1/1976 Yokotsuka et al. .......... 435/68.1
6,858,405 B1 * 2/2005 Nakamura et al. .......... 435/68.1

FOREIGN PATENT DOCUMENTS

| JP | 05-084048 | | 4/1993 |
| JP | 05084048 A | * | 4/1993 |
| JP | 11-032718 | | 2/1999 |
| JP | 2000-014394 | | 1/2000 |
| JP | 2001-037440 | | 2/2001 |
| WO | WO 2007/066437 | | 6/2007 |
| WO | WO 2008/081800 | | 7/2008 |
| WO | WO 2009077359 A1 | * | 6/2009 |

OTHER PUBLICATIONS

International Search Report, PCT/JP2010/065393, Oct. 5, 2010.

* cited by examiner

*Primary Examiner* — Humera Sheikh
*Assistant Examiner* — Subbalakshmi Prakash
(74) *Attorney, Agent, or Firm* — Young & Thompson

(57) ABSTRACT

A method for producing a powdery seasoning of the present invention includes hydrolyzing a protein material with a liquid koji mold cultured in a medium containing wheat bran which has been ground to pass through a 0.3 mm mesh sieve to prepare a hydrolysate, and spray drying the hydrolysate without removing a solid. According to the method for producing the powdery seasoning of the present invention, provided is a powdery seasoning which is spray-dryable without undergoing any solid removal process such as squeezing or filtering after hydrolysis, and achieves higher storage stability than prior art powdery seasoning prepared from a protein hydrolysate liquid.

3 Claims, 1 Drawing Sheet

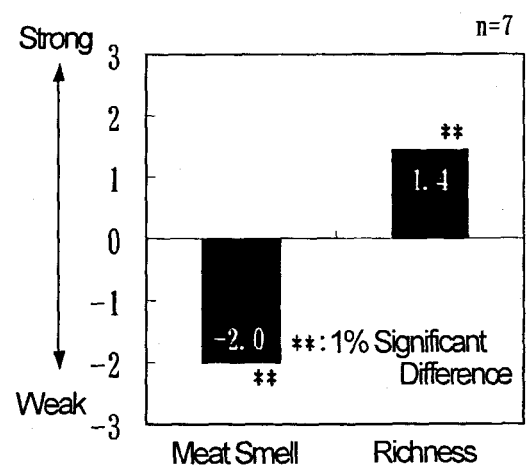
Rating of the product of the present invention in comparison with comparative example (Prior art product)
(Paired comparison method)

POWDERY SEASONING AND METHOD FOR PRODUCING THE SAME

TECHNICAL FIELD

The present invention relates to a powdery seasoning and a method for producing the same.

BACKGROUND ART

Storage stability of powdery seasonings is commonly improved by adding an excipient such as dextrin in an amount of 20 to 40% by weight of the powder to be obtained, and powdering the mixture. It is also known that deterioration in storage stability of a powdery seasoning prepared from a protein hydrolysate seasoning liquid, such as color thickening or caking during storage, is markedly improved by drastically decreasing the moisture content (for example, see Patent Literature 1), and that caking of a seasoning is prevented by adding fine water-insoluble dietary fiber (for example, see Patent Literature 2).

Also known is a method for producing a powdery seasoning, including forcibly filtering a soy sauce mash through a net to remove the unedible part derived from the raw material, followed by spray drying to make a dry powder (for example, see Patent Literature 3). Examples of known methods for producing a dry powder without removing the unedible part from the mash include a method of forming the mash into a film using a drum dryer and drying the film, or freeze drying the mash, followed by grinding. However, drying and grinding processes are individually necessary, and the whole amount of the dried seasoning must be ground. In addition, spray drying for making a powder concurrently with drying can cause clogging of the nozzles by the unedible part of the mash, so that spray drying cannot be used for this purpose.

CITATION LIST

Patent Literature

Patent Literature 1: Japanese Patent Application Laid-Open (JP-A) No. 2001-37440
Patent Literature 2: Japanese Patent No. 3027977
Patent Literature 3: JP-A No. 11-32718

SUMMARY OF INVENTION

Technical Problem

The present invention is intended to provide a powdery seasoning which is advantageous for industrial applications because it is spray-dryable without undergoing any solid removal process such as squeezing (pressing) or filtering, and achieves higher storage stability than prior art powdery seasoning prepared from a protein hydrolysate liquid, because it is less prone to cause color thickening and caking during storage after powdering.

Solution to Problem

As a result of dedicated research for solving the above-described problems, the inventors have found that a powdery seasoning which can be spray-dryable without undergoing any solid removal process after hydrolysis is obtained by hydrolyzing a protein material with a liquid koji mold cultured in a medium containing wheat bran which has been ground to pass through a 0.3 mm mesh sieve, and that surprisingly the powdery seasoning thus obtained is less prone to cause color thickening and caking during storage than prior art powdery seasonings prepared from protein hydrolysate seasoning liquids. The present invention has been accomplished based on these findings.

More specifically, the present invention relates to the powdery seasoning and method for producing the same described below.

(1) A method for producing a powdery seasoning, including hydrolyzing a protein material with a liquid koji mold cultured in a medium containing wheat bran which has been ground to pass through a 0.3 mm mesh sieve to prepare a hydrolysate, and spray drying the hydrolysate without removing a solid.

(2) A powdery seasoning including a hydrolysate prepared by hydrolyzing a protein material with a liquid koji mold cultured in a medium containing wheat bran which has been ground to pass through a 0.3 mm mesh sieve, the powdery seasoning having an insoluble solid content of 5% (w/w) or more.

(3) Food and drink including the powdery seasoning of (2).

Advantageous Effects of Invention

According to the present invention, provided is a powdery seasoning which is advantageous for industrial applications because it is spray-dryable without undergoing any solid removal process such as squeezing or filtering, and achieves higher storage stability than prior art powdery seasoning prepared from a protein hydrolysate liquid, because it is less prone to cause color thickening and caking during storage after powdering.

BRIEF DESCRIPTION OF DRAWINGS

FIG. 1 is a graph showing the result of the evaluation (couple comparative method) of the product of the present invention in comparison with Comparative Example (prior art product).

DESCRIPTION OF EMBODIMENTS

In order to carry out the present invention, firstly, wheat bran is ground to pass through a 0.3 mm mesh sieve. The wheat bran may be freely selected from prior art ones used for the production of liquid koji molds. Grinding of wheat bran may use a common procedure.

Secondly, a liquid koji mold is produced according to a common procedure using a medium containing the wheat bran, which has been ground to pass through a 0.3 mm mesh sieve. The production of the liquid koji mold may be carried out according to, for example, the explanation in JP-A No. 2002-218970. A preferred method for producing a liquid koji mold is described below.

Firstly, wheat bran, which has been ground to pass through a 0.3 mm mesh sieve, is mixed with water to make a medium. At this time, the weight of water is preferably from 10 to 30 times of the weight of the wheat bran. Secondly, the medium is preferably adjusted to pH 6 to 9. The pH adjustment may use a common procedure. Thereafter, the medium is preferably subjected to heat sterilization.

Subsequently, a liquid culture is mixed with the medium. It is preferred that 0.05 to 0.3 L of the liquid culture be mixed with 100 kg of the medium. The liquid culture may be selected from those conventionally used for the production of liquid koji molds. The liquid culture is obtained by, for example, inoculating a koji mold of a microorganism such as

*Aspergillus oryzae* or *Aspergillus sojae* into a liquid medium, and culturing the koji mold under aeration and agitation at pH 6 to 9, 25 to 35° C., for 48 to 96 hours. The aeration rate is preferably from 0.25 to 0.75 vvm. It is preferred that the koji mold be inoculated into the liquid medium so as to give a spore concentration of 100 to 500 spore/ml in the liquid medium. The liquid medium used for the preparation of the liquid culture may be freely selected from those suitable for growth of the microorganism. For example, the liquid medium may contain, as appropriate, a carbon source such as soluble starch or glucose; a nitrogen source such as soybean powder, separated soybean protein, or yeast extract; a trace nutrient such as $CaCl_2$, $KH_2PO_4$, or $MgSO_4$; and an antifoaming agent such as silicon oil and soy sauce oil.

Subsequently, the wheat bran-containing medium mixed with the liquid culture is cultured under aeration and agitation, thereby obtaining a liquid koji mold. The culturing is preferably carried out for 48 to 96 hours at an aeration rate of 0.25 to 0.75 vvm and a temperature of 25 to 35° C.

In the method of the present invention for producing a powdery seasoning, a protein material is hydrolyzed by the liquid koji mold. More specifically, the protein material is mixed with the liquid koji mold and as necessary water, and hydrolyzed in the presence or absence of salt to prepare a mash (hydrolysate). The hydrolysis is preferably carried out at a salt concentration of 0 to 15%, a temperature of 15 to 60° C., and for a period of 1 to 7 days. The protein material, liquid koji mold, and water is preferably mixed at a ratio of 40 to 80 kg of the protein material and 0 to 50 L of water to 100 L of the liquid koji mold.

The hydrolysate thus obtained is spray-dried without undergoing any solid removal process such as squeezing or filtering.

Examples of the protein material used in the present invention include high-protein materials, such as grains containing vegetable proteins, and domestic animals, whales and fishes containing animal proteins.

Examples of the vegetable protein include soybean protein obtained from soybean, wheat or corn gluten obtained from wheat or corn. Examples of the animal protein include gelatin obtained from animal skin collagen, and albumin and globulin obtained from meat, eggs, and milk of animals. Among them, wheat gluten is most preferred in terms of the cost.

Further, in the present invention, other examples of the protein-containing material include any of these vegetable proteins and animal proteins extracted by a known method, which may be partially or completely purified as necessary. In the purifying process of the present invention, the protein material preferably has a minimum carbohydrate content, and for example, has a protein content of 50% by weight or more. The protein may be denatured or native. For example, as necessary, the protein may be physically or chemically denatured in the extraction or purification process. Examples of physical denaturalization include denaturalization by heating, pressurization, or freezing, and examples of chemical denaturalization include denaturalization by any acid, alkali, or alcohol. These purified proteins may be used alone or in combination.

Spray drying may be carried out after adding an excipient to the hydrolysate. When the salt concentration during hydrolysis is 5% or more, the addition of an excipient is preferred. Examples of the excipient added for spray drying include dextrin, gelatin, and soluble starch. The amount of the excipient is preferably from 5 to 30% (w/v), and more preferably from 15 to 25% (w/v) with respect to the hydrolysate. If the amount is less than 5% (w/v), the recovery of the powdery seasoning is decreased, while more than 30% (w/v), the powdery seasoning has an obscure flavor.

The spray drying may be carried out using an ordinary spray drying apparatus (spray dryer). The spray drying is preferably carried out at a hot air inlet temperature of 160 to 200° C., and an outlet temperature of 70 to 100° C., specifically from 80 to 100° C. If the temperature is too low, the efficiency of spray drying decreases, while too high, the powdery seasoning smells undesirably something burning.

As described above, obtained is a powdery seasoning which is advantageous for industrial applications because it is spray-dryable without undergoing any solid removal process such as squeezing or filtering, and achieves higher storage stability than prior art powdery seasoning prepared from a protein hydrolysate liquid, because it is less prone to cause color thickening and caking during storage after powdering.

In order to further improve storage stability, the powdery seasoning preferably contains 5% (w/w) or more of insoluble solid. From the viewpoint of the flavor of the powdery seasoning, the content of the insoluble solid in the powdery seasoning is preferably up to 10% (w/w). In the present invention, the term "insoluble solid" refers to the solid which is not soluble in the water obtained by dissolving the powdery seasoning in water, followed by filtering through filter paper. The insoluble solid is composed mainly of the wheat bran derived from the liquid koji mold, and further contains bacterial cells derived from the liquid koji mold, and a protein material. Two types of filter paper defined in JIS P 3801 (for example, No. 2 manufactured by Advantec Co., Ltd.) may be used for measuring the amount of the insoluble solid.

The powdery seasoning of the present invention is low cost, markedly restorable upon addition of water after storage, in addition, its suspension has rich umami and light color. Therefore, the powdery seasoning is suitable for various foods and drinks, such as seasoning materials for instant noodles (instant Chinese noodles, instant udon noodles, and instant soba noodles); bases of various soups; seasonings for various sauces (for example, grill sauce and sukiyaki sauce) and soups; seasonings for various pickles; seasonings for processed meat products such as ham, sausage, bacon, dry sausage, and beef jerky; seasonings for processed marine products such as fish meat ham, fish meat sausage, boiled fish paste, tube-shaped fish paste cake, and cake of pounded fish; seasonings for various processed delicacies such as sea urchin, salted cuttlefish guts, and dried fishes and shellfishes; seasonings for foods boiled in soy sauce made with ingredients such as seaweed, small fishes, dried cuttlefishes, vegetables, edible wild plants, mushrooms, and kombu; seasonings for instant curry and retort-packed curry; umami enhancers for various seasonings such as ketchup and mayonnaise; umami enhancers for various microwave food and frozen food. The amount of the powdery seasoning in these foods and drinks may be appropriately chosen according to the type of the food or drink. In normal cases, the amount is preferably from 0.1 to 5.0% (w/w).

The present invention is further described below with reference to examples.

Example 1

Production of Liquid Koji Mold

Wheat bran was ground by a common procedure, fractionated using a 0.3 mm mesh sieve, thereby obtaining wheat bran ground to pass through a 0.3 mm mesh sieve.

Subsequently, 80 kg of the wheat bran and 1600 L of water were charged into a 2000 L fermentation tank, which contains a double six-blade turbine and has many air nozzles opened at the bottom. The pH in the tank was adjusted to 6.5, and heat sterilization treatment was carried out by a common procedure. To the tank, 4 L of a liquid culture of *Aspergillus oryzae*, which had been prepared in advance, was added, and cultured for 72 hours under aeration and agitation at an aeration rate of 0.5 vvm, an agitation rate of 200 rpm, and a temperature of 30° C., thereby obtaining a liquid koji mold.

(Production of Powdery Seasoning)

100 L of the liquid koji mold was mixed with 60 kg of wheat gluten and 55 L of saturated saline solution, the mixture was hydrolyzed at 45° C. for 96 hours, thereby obtaining a wheat gluten hydrolysate. The hydrolysate thus obtained was not subjected to squeezing or filtering. 15% (w/v) of dextrin was added to the hydrolysate and dissolved therein, and the mixture was dry-powdered using a spray drying apparatus (spray dryer) at an inlet temperature of 180 to 200° C. and an outlet temperature of 80 to 100° C., thereby obtaining the powdery seasoning of the present invention.

(Comparative Powdery Seasoning)

For comparison, a comparative powdery seasoning (prior art product) was prepared in the same manner as in the method of the present invention for producing a powdery seasoning, except that the wheat gluten hydrolysate was spray-dried after squeezing and filtering for removing the solid.

(Measurement of Insoluble Solid Content)

10 g of the powdery seasoning of the present invention was dissolved in 100 ml of water, the solution was filtered through filter paper (No. 2, manufactured by Advantec Co., Ltd.), and the residue was dried at 105° C. for 6 hours and allowed to cool. Thereafter, the solid was weighed, and the content of the insoluble solid in the powdery seasoning was calculated.

(Color Stability Test)

The powdery seasonings of the present invention and Comparative Example were placed in PET pouches and sealed, and stored for 191 days at a temperature of 35° C. The L* value before and after storage was measured, and the change of the L* value (change of color) was determined. The L* value of the powdery seasonings (the higher the value, the brighter the color) was measured using a spectroscopic color-difference meter (SA-4000, manufactured by Nippon Denshoku Industries Co., Ltd.). The results are shown in Table 1.

(Caking Stability Test)

1 g of the powdery seasoning was weighed in a weighing dish, and stored in an atmosphere kept at a temperature of 30° C. and a relative humidity of 52%. The moisture content and condition of the powdery seasoning were observed at periodic intervals, and the caking stability of the powdery seasonings of the present invention and Comparative Example was rated. The results are shown in Table 2.

TABLE 1

| Sample | Squeezing, filtering | Insoluble solid % (w/w) | L* value Day 0 | L* value Day 191 | Change in L* value | Rating |
| --- | --- | --- | --- | --- | --- | --- |
| Product of present invention | None | 5 | 80 | 75 | −5 | Good |
| Comparative example (prior art product) | Squeezed and filtered | 0 | 80 | 55 | −25 | Not good |

TABLE 2

| Sample | Test period (hour) | Moisture content % (w/w) | Caking | Condition of powder |
| --- | --- | --- | --- | --- |
| Product of present invention | 3 | 3.0 | ○ | Readily crumbled |
| | 6 | 3.9 | ○ | Readily crumbled |
| | 9 | 4.8 | ○ | Crumbled |
| | 15 | 6.9 | Δ | Wet, but somehow crumbled |
| | 24 | 8.3 | X | Wet |
| Comparative example (prior art product) | 3 | 3.0 | ○ | Crumbled |
| | 6 | 4.9 | Δ | Wet, but somehow crumbled |
| | 9 | 6.2 | Δ | Wet, but somehow crumbled |
| | 15 | 8.7 | X | Wet |
| | 24 | 10.3 | X | Wet |

○: No caking
Δ: Slightly caked
X: Caked

The results in Table 1 indicate that the product of the present invention containing wheat bran shows less change in the L* value, and its color is less prone to be thicken during storage in comparison with Comparative Example (prior art product) containing no wheat bran. The results in Table 2 indicate that the product of the present invention has lower hygroscopicity, and thus has better caking stability in comparison with Comparative Example.

Example 2

Relationship Between Wheat Bran and Wheat Gluten Hydrolysate (Powdery Seasoning of Comparative Example)

For comparison, wheat gluten hydrolysates of Comparative Examples 1 and 2 were obtained in the same manner as in the production of the powdery seasoning of the present invention, except that the wheat bran ground to pass through a 0.3 mm mesh sieve was replaced with wheat bran ground to pass through a 0.5 mm mesh sieve (Comparative Example 1), or unground wheat bran (Comparative Example 2) to use.

In order to predict the degree of clogging of spray dryer nozzles, 500 ml of the wheat gluten hydrolysate of the present invention and Comparative Examples 1 and 2 were filtered through a 0.7 mm mesh sieve, and the amount of the wheat gluten hydrolysate passing through the sieve was measured. When the hydrolysate is passable through a 0.7 mm mesh sieve, it can pass through spray dryer nozzles. The results are shown in Table 3.

TABLE 3

| Sample | Mesh size of sieve through which wheat bran used for liquid koji mold is passable | Amount of hydrolysate passing through a 0.7 mm mesh sieve when 500 ml of hydrolysate is screened (ml) | Rate (%) | Rating |
| --- | --- | --- | --- | --- |
| Product of present invention | 0.3 mm | 495 | 99 | Good |
| Comparative Example 1 | 0.5 mm | 300 | 60 | Unacceptable |
| Comparative Example 2 | unground | 340 | 68 | Unacceptable |

The results in Table 3 indicate that the wheat bran used for culturing of the liquid koji mold must be passable through a 0.3 mm mesh sieve as in the present invention, because the unground wheat bran as in Comparative Example 2 and the wheat bran ground to pass through a 0.5 mm mesh sieve as in Comparative Example 1 are so large that the solid of the hydrolysate insufficiently passes through a 0.7 mm mesh sieve or spray dryer nozzles.

Example 3

Preparation of Hamburger Steak

Hamburger steaks were prepared using the product of the present invention prepared in Example 1 and comparative Example (prior art product). 5 g of the product of the present invention or Comparative Example (prior art product) was added to 500 g of a mixture of ground beef and pork, and hamburger steaks were prepared using the mixture according to a common procedure.

(Sensory Evaluation)

Hamburger steaks containing the product of the present invention or Comparative Example (prior art product) were served to seven panelists, and the meat smell and richness of taste of the hamburger steak containing the product of the present invention were evaluated in comparison with the hamburger steak containing Comparative Example (prior art product). The richness of taste refers to the intensity of umami lasting during tasting. The evaluation was carried out on a scale ranging from −3 to +3: 0 means that the ratings are the same, and plus or minus means that the rating of the product of the present invention is higher or lower than that of Comparative Example (prior art product). The ratings were averaged, and the results are shown in FIG. 1. The figures in the bar graph are averages of the seven panelists.

The results in FIG. 1 indicate that the product of the present invention reduces the meat smell of the hamburger steak, and increases the richness of the taste, in comparison with Comparative Example (prior art product).

The invention claimed is:

1. A method for producing a powdery seasoning, comprising:
    culturing a liquid koji mold from a medium containing a liquid culture, water and a wheat bran which has been ground to pass through a 0.3 mm mesh sieve;
    hydrolyzing a protein material with said liquid koji mold to prepare a hydrolysate liquid; and
    spray drying the hydrolysate liquid without prior removal of any insoluble solids to form a powdery seasoning.
2. The method according to claim 1, wherein the protein material is a vegetable protein.
3. The method according to claim 2, wherein the vegetable protein is soybean protein, wheat gluten or corn gluten.

* * * * *